UNITED STATES PATENT OFFICE.

GEORGE J. PACK, OF NEW YORK, N. Y.

IMPROVEMENT IN PREPARING GOLD FOR DENTISTS' USE.

Specification forming part of Letters Patent No. 126,830, dated May 14, 1872.

SPECIFICATION.

*To all whom it may concern:*

Be it known that I, GEORGE J. PACK, of the city, county, and State of New York, have invented an Improved Process of Preparing Gold for Dental Purposes, of which the following is a specification:

The gold is first beaten into foil, the sheets are then immersed in water or a volatile liquid, as alcohol, and aggregated into a compact mass by beating, agitation, or by any convenient means. When compacted the mass is removed from the liquid, and the moisture expelled from the pores by heat and evaporation. If the liquid employed for the purpose is inflammable, it may be ignited and consumed; if water is used the application of heat sufficient to expel all remaining moisture by evaporation is necessary. The product may, if desired, be put in market in this state, or the mass may be pressed or cut into layers of suitable thickness, and these again cut into blocks or strips of convenient size for use. The gold may be used in this condition, or the blocks or strips finished by covering them with a wrapping of adhesive gold-foil, which shields the surface and prevents the absorption of moisture, dust, or other foreign matter.

The aggregation of the foil while immersed in liquid prevents the too great adhesion of the particles, and the consequent solidifying of the mass, and leaves it uniformly porous and spongy, while the application of heat, either externally or by the combustion of spirits, if such be employed, anneals the gold and leaves it in the most suitable condition for use.

*Claims.*

What I claim as my invention is—

1. The process of preparing gold for dental purposes by aggregating gold-foil while immersed in liquid, and afterward expelling the moisture from the aggregated mass by heat, substantially as set forth.

2. The blocks or strips of porous gold, so prepared and shielded by covering with adhesive gold-foil, as set forth.

In witness whereof I have hereunto signed my name in the presence of two subscribing witnesses.

GEO. J. PACK.

Witnesses:
 J. FRASER,
 GEO. W. MIATT.